W. S. ARCHER.
HORSE HAY-RAKE.
No. 7,179. Reissued June 20, 1876.
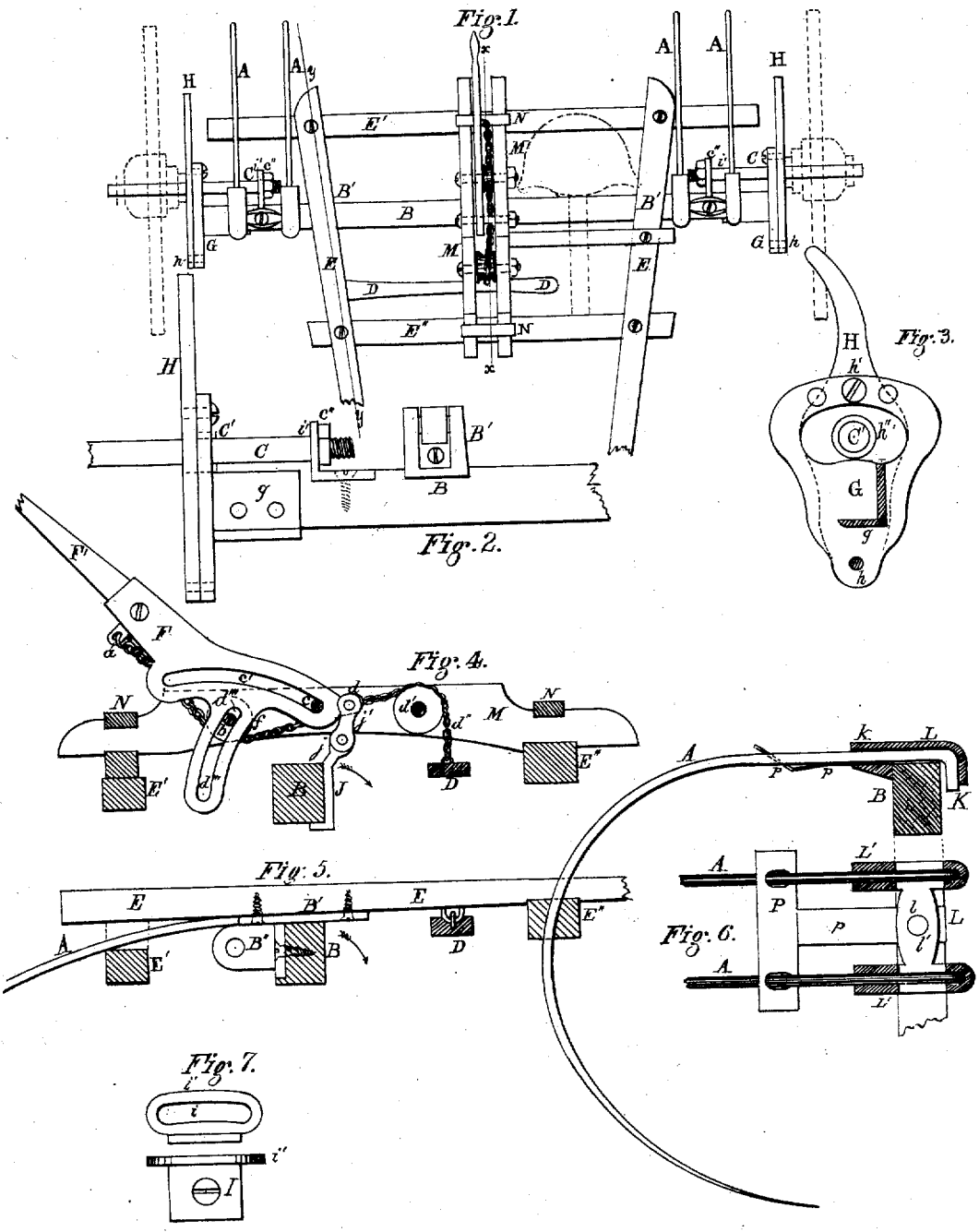
WITNESSES:
C. M. Connell
Alfred Clough
INVENTOR.
William S. Archer
Pr. Blanchard & Singleton ATTORNEYS
N. PETERS, PHOTO-LITHOGRAPHER, WASHINGTON, D. C.

UNITED STATES PATENT OFFICE.

WILLIAM S. ARCHER, OF DAYTON, OHIO, ASSIGNOR OF THREE-FOURTHS OF HIS RIGHT TO CHARLES B. CLEGG, E. MORGAN WOOD, AND GEORGE A. ARCHER.

IMPROVEMENT IN HORSE HAY-RAKES.

Specification forming part of Letters Patent No. 160,993, dated March 23, 1875; reissue No. 7,179, dated June 20, 1876; application filed May 20, 1876.

*To all whom it may concern:*

Be it known that I, WILLIAM S. ARCHER, of Dayton, in the county of Montgomery and State of Ohio, have invented certain new and useful Improvements in Horse Hay-Rakes; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1 is a plan view of the horse hay-rake, showing the several improvements. Fig. 2 is part of the rake-head, to which the fork-teeth are to be attached. Fig. 3 is a front view of the adjusting-plates by which the elevation of the fork is regulated. Fig. 4 is a sectional elevation of part of Fig. 1, on the line *x x*, showing the method of pivoting and operating the hand-lever and the treadle. Fig. 5 is a sectional elevation of Fig. 1, on line *y y*, showing the hinge by which the horse-shafts are connected to the rake-head. Fig. 6 represents a cross-section and a plan view of the plate-clips which retain the teeth upon the rake-head, and the guard-plate over the teeth to stop the hay. Fig. 7 represents two views of the flanged plate for the support of the wheel-spindle at any point which may be required by the adjustment, as shown in Fig. 3, of the two plates.

The nature of this invention relates to several improvements in horse hay-rakes, whereby they can be more economically constructed, and their operation be more readily controlled, and also in simplifying the devices, and thus rendering the whole apparatus less liable to derangement of parts, as will hereinafter be more fully described.

In the drawing, A A represent the teeth. B is the rake-head, to which the teeth are attached by plates L, in sets of two or more. C C are wheel-spindles in the rear of the rake-head, and fastened adjustably thereto by plates, to be described hereafter. D is a foot-lever, hinged at one end under the shaft, and to which is fastened a chain, *d''*, leading over a pulley, *d'*, and under the pin *c*, and another pulley, *f*, and affixed to a catch, *a*, on the lever F. E E are the horse-shafts, which are hinged to the rake-head B at B', and permanently fastened to the beams E' at the rear, and E'' in front, which act as braces, and form the frame of the rake. F is a hand-lever of peculiar structure and action, having no fixed fulcrum, but bearing upon a fulcrum-pin, *c*, along the groove *c'*, thus, while in motion, lessening the power of the long arm F' by increasing the distance between the fulcrum-pivot *c* and the other end of the lever at *d*, where the weight of the load in the teeth will increase the motion of discharge, as the rake-head turns in the direction of the arrow in Figs. 4 and 5, by the resistance of the load against the teeth, they acting as levers to turn upwardly and permit the load to drop out. The pin *b* in the lower slot *d'''* of the lever acts as a guide, and is never reached by the upper end of the slot, therefore cannot act as a fulcrum. G H are plates, pivoted together at *h*, and secured in position relative to each other laterally by a screw-bolt at *h'*, where there are represented three holes; but any number desired may be used. The flange-plate *g* has screw-holes, by which the plate G is secured permanently to the axle or turning beam. In the plate H there is a projecting pipe, *h''*, through which the wheel-spindle passes to receive the wheel, the other end of the spindle being secured in a flanged plate, I, by a groove, *i*, formed in a segment of a circle, *i'*, so that when the plate H, carrying the spindle in the pipe *h''*, is moved to either of the positions at *h'*, the other end of the spindle at *c''* can be moved to its parallel position with the axle B, and secured there by the nut-and-screw fastening *c''*. This movement of plates G and H is to adjust the teeth to a higher or lower position, to suit the ground or character of the work to be performed. J is a plate secured to rake-head B, having a tongue, *j*, to which is pivoted a double link, *j'*, the upper end of which is pivoted to the end *d* of lever F. This link *j'* permits the free movement of the rake-head B, when the load causes it to rotate in direction of the arrow to be discharged. K is the hooked end of the teeth A A, which laps over the rake-head B, and is held in position loosely by the clip or plate L, which is constructed with two shanks, L′ L′, having within them grooves to cover the teeth, and a cross-bar, *l*, which is fastened to the rake-head B by a screw at *l′*, so that by this arrangement two teeth can be secured by one screw or bolt. More teeth than two can be secured by constructing a plate for their reception in a similar manner. M M are the bearers in which the lever and pulleys with the chain are arranged, and are braced together and held down to the frame by straps N N and screw-bolts. In these bearers M M the bolts *b c* and pulley *d′* are so arranged that the upper end of the slot *d‴* shall never bear upon the pin *b* to form a fulcrum.

The construction and operation of the rake are as follows: The teeth A A are attached to the rake-head B, which can be turned to raise them and discharge the load either by its weight or by the lever F. The rake-head B is hung to and in front of the spindles C C, upon which the wheels revolve. The teeth A A are held in position for raking by the pressure of the driver's foot upon the treadle-lever D, and the load, when accumulated, discharges itself upon releasing the foot from the treadle, which discharge may be assisted by the hand-lever F, if found necessary from any unusual cause. This automatic discharge of the load is due to the manner of hanging the rake-head B to the shafts E, and in such relation to the wheel-spindles C C that sufficient leverage is obtained, by the action of the load on the teeth, to easily turn the rake-head, thereby causing the teeth to be raised and discharge the load. This is effected by placing the center of revolution so far back on the shafts as to throw the weight of the rake-head and the plates attached thereto proportionately beyond that center, so as to act, in some measure, as an auxiliary weight to the load and its resistance along the ground in dragging, so that all of that weight on the rake-head helps the revolving tendency when the foot-lever is released. So soon as the load shall have been discharged the pressure of the foot on the treadle draws the lever F down again, and the rake-head B resumes its proper position. The driver can reset the teeth by the foot-lever alone, and the teeth are retained in their raking position by the pressure of the foot acting upon the chain, which, being fastened to the lever F at *a*, and passing under the pin *c*, gives a powerful control of the lever when down, because the distance of the fulcrum-pin *c* from the end of the lever at *d* is the shortest possible when the teeth are gathering the load, which, in the present case, made upon the proper proportions suited to practical results, gives the long arm to the short as fourteen to one. So soon, however, as the load is ready for discharging, the lever D being released, the revolution of rake-head B draws the end *d* of lever F downward and forward, constantly diminishing the proportion from fourteen to one to the maximum of ten to five, which gives a rapidly-increasing motion in discharging the load. These are the proportions in the present case, but any other may be used.

The foot-lever is swung at one end to the shafts; but any other means may be employed to draw the chain tight by the application of the foot.

The hand-lever can be used alone to hold the rake-teeth, or for lowering and raising them.

The teeth-fastening is an improvement upon my former patent, granted April 11, 1874.

The teeth pass over the rake-head B, and are bent down to the front thereof, and are held loosely in grooves in the clip or plate L, which plate, having two grooved shanks, holds two teeth, and by the perforated connecting-bar *l* is held down by one screw in hole *l′*, thus affording a ready means of fastening or releasing the teeth when necessary. The spring of the teeth is accomplished by the two points of bearing—viz., at K and *k*.

A perforated plate, P, is employed to prevent the hay from passing upon the back of the teeth, as seen in Fig. 6. This plate P has a shank, *p*, by which it is fastened to the axle by the same bolt which secures the clip L, and covers the teeth in pairs, whereby it is made to act as a support for two rake-teeth against side pressure, as well as to prevent the clogging of the hay around the upper ends of the teeth.

In this construction of a horse hay-rake there is no gearing, clutches, or ratchets in the wheels, or any other machinery to effect the discharge of the load; nor is it necessary to use the weight of the driver for this purpose.

In the present arrangement the load is quickly discharged automatically from the change of fulcrum in the lever F, and, practically, little time is lost in the operation.

Having thus described my invention, what I claim, and desire to secure by Letters Patent, is—

1. In a horse hay-rake, a vertically-adjustable and swinging rake-head, hinged at its rear side to the shafts of the machine, it being arranged with reference to the wheel-spindles, substantially as shown, whereby the position of the outer ends of the rake-teeth can be regulated with reference to the ground, and whereby the resistance offered by the material to be gathered is made to aid in swinging the head to a position below the spindles, for the purpose of facilitating the discharge of the load, substantially as set forth.

2. The slotted curved lever F, in combination with the connecting-links *j* and *j′* and rake-head B, substantially as and for the purpose described.

3. The slotted plate G and plate H, combined with the spindle C, slotted plate I, and rake-head B, substantially as and for the purpose described.

4. The combination of the slotted lever F, pins *b c*, link *j'*, chain *d''*, treadle D, and rake-head B, for the purpose described.

5. The guard-plate P, when constructed as shown, and combined with the teeth-holders L L', whereby it is made to act as a support for two rake-teeth against side pressure, as well as to prevent the clogging of the hay around the upper ends of the teeth.

In testimony that I claim the foregoing I have hereunto set my hand this 9th day of May, 1876.

WILLIAM S. ARCHER.

Witnesses:
D. B. VAN PELT,
JOHN A. SHAUCK.